(12) United States Patent
Coulter et al.

(10) Patent No.: US 9,977,978 B2
(45) Date of Patent: May 22, 2018

(54) IMAGE STATION MATCHING, PREPROCESSING, SPATIAL REGISTRATION AND CHANGE DETECTION WITH MULTI-TEMPORAL REMOTELY-SENSED IMAGERY

(71) Applicant: San Diego State University Research Foundation, San Diego, CA (US)

(72) Inventors: Lloyd Lawrence Arthur Coulter, Escondido, CA (US); Douglas A. Stow, San Diego, CA (US)

(73) Assignee: San Diego State University Research Foundation, San Diego, CA (US)

(*) Notice: Subject to any disclaimer, the term of this patent is extended or adjusted under 35 U.S.C. 154(b) by 0 days. days.

(21) Appl. No.: 13/676,854

(22) Filed: Nov. 14, 2012

(65) Prior Publication Data

US 2014/0064554 A1  Mar. 6, 2014

Related U.S. Application Data

(60) Provisional application No. 61/559,706, filed on Nov. 14, 2011.

(51) Int. Cl.
*G06K 9/00* (2006.01)
*G06K 9/32* (2006.01)
(Continued)

(52) U.S. Cl.
CPC ......... *G06K 9/3216* (2013.01); *G06K 9/0063* (2013.01); *G06T 3/0093* (2013.01);
(Continued)

(58) Field of Classification Search
CPC . G06T 7/20; G06T 7/254; G06T 2207/10032; G06T 2207/30212;
(Continued)

(56) References Cited

U.S. PATENT DOCUMENTS

| | | | |
|---|---|---|---|
| 7,454,067 B1 * | 11/2008 | Pati | 382/225 |
| 2004/0257441 A1 * | 12/2004 | Pevear | B64D 47/08 |
| | | | 348/144 |
| 2009/0010493 A1 * | 1/2009 | Gornick et al. | 382/103 |

OTHER PUBLICATIONS

Boland, Michael V. Quantitative description and automated classification of cellular protein localization patterns in fluorescence microscope images of mammalian cells. Diss. Carnegie Mellon University, 1999.*

(Continued)

*Primary Examiner* — Geoffrey E Summers
(74) *Attorney, Agent, or Firm* — Juneau & Mitchell; Todd L. Juneau

(57) ABSTRACT

A method for collecting and processing remotely sensed imagery in order to achieve precise spatial co-registration (e.g., matched alignment) between multi-temporal image sets is presented. Such precise alignment or spatial co-registration of imagery can be used for change detection, image fusion, and temporal analysis/modeling. Further, images collected in this manner may be further processed in such a way that image frames or line arrays from corresponding photo stations are matched, co-aligned and if desired merged into a single image and/or subjected to the same processing sequence. A second methodology for automated detection of moving objects within a scene using a time series of remotely sensed imagery is also presented. Specialized image collection and preprocessing procedures are utilized to obtain precise spatial co-registration (image registration) between multitemporal image frame sets. In addition, specialized change detection techniques are employed in order to automate the detection of moving objects.

8 Claims, 18 Drawing Sheets

(51) Int. Cl.
 G06T 3/00 (2006.01)
 G06T 7/33 (2017.01)
 G06T 7/254 (2017.01)
(52) U.S. Cl.
 CPC .............. *G06T 7/254* (2017.01); *G06T 7/33* (2017.01); *G06T 2207/10032* (2013.01); *G06T 2207/30181* (2013.01); *G06T 2207/30212* (2013.01)
(58) Field of Classification Search
 CPC ......... G06T 2207/30181; G06T 3/0093; G06T 7/33; G06K 9/0063; G06K 9/00637; G06K 2209/00644; G06K 9/00651; G06K 9/00657; G06K 2009/00644; G06K 9/3216
 USPC ........................................................ 382/103
 See application file for complete search history.

(56) References Cited

OTHER PUBLICATIONS

Coulter, Lloyd L., Douglas A. Stow, and Sebastian Baer. "A frame center matching technique for precise registration of multitemporal airborne frame imagery." Geoscience and Remote Sensing, IEEE Transactions on 41.11 (2003): 2436-2444.*

Coulter, L., et al. "Near real-time change detection for border monitoring." Proceedings from the ASPRS annual conference. 2011.*

Radke, Richard J., et al. "Image change detection algorithms: a systematic survey." Image Processing, IEEE Transactions on 14.3 (2005): 294-307.*

Stefanov, William L., Michael S. Ramsey, and Philip R. Christensen. "Monitoring urban land cover change: An expert system approach to land cover classification of semiarid to arid urban centers." Remote Sensing of Environment 77.2 (2001): 173-185.*

Stow, D., L. Coulter, and S. Baer. "A frame centre matching approach to registration for change detection with fine spatial resolution multi-temporal imagery." International Journal of Remote Sensing 24.19 (2003): 3873-3879.*

Zhan, X., et al. "The 250 m global land cover change product from the Moderate Resolution Imaging Spectroradiometer of NASA's Earth Observing System." International Journal of Remote Sensing 21.6-7 (2000): 1433-1460.*

Coulter, L., and D. Stow. "Detailed change detection using high spatial resolution frame center matched aerial photography." Proceedings of the 20th Biennial Workshop on Aerial Photography, Videography, and High Resolution Digital Imagery for Resource Assessment. 2005.*

Stow, Douglas, et al. "Monitoring shrubland habitat changes through object-based change identification with airborne multispectral imagery." Remote Sensing of Environment 112.3 (2008): 1051-1061.*

Coulter, Lloyd L., and Douglas A. Stow. "Assessment of the spatial co-registration of multitemporal imagery from large format digital cameras in the context of detailed change detection." Sensors 8.4 (2008): 2161-2173.*

"Flight Management." Aerial Surveys International. Aerial Surveys International, Aug. 21, 2008. Web. Sep. 18, 2015.*

Zitova, Barbara, and Jan Flusser. "Image registration methods: a survey." Image and vision computing 21.11 (2003): 977-1000.*

Coulter, Lloyd L., and Douglas A. Stow. "Monitoring habitat preserves in southern California using high spatial resolution multispectral imagery." Environmental monitoring and assessment 152.1 (2009): 343-356.*

\* cited by examiner

IMAGE STATION MATCHING, PREPROCESSING, SPATIAL REGISTRATION AND CHANGE DETECTION WITH MULTI-TEMPORAL REMOTELY-SENSED IMAGERY

CROSS-REFERENCE TO RELATED APPLICATIONS

This application claims the benefit of priority of U.S. Application No. 61/559,706, filed Nov. 14, 2011, which is hereby incorporated by reference in its entirety.

STATEMENT REGARDING FEDERALLY SPONSORED RESEARCH

This invention was made with government support under PO No. Y50264/2008-ST-061-BS0002 awarded by the Department of Homeland Security, and under Grant NAG13-99017 by the NASA Food and Fiber Applications in Remote Sensing (FFARS) Program. The government has certain rights in the invention.

FIELD

The present application relates, in some embodiments, to image station matching (returning a camera to the same absolute or relative spatial position and viewing the same scene with nearly identical viewing geometry) and spatial co-registration of multitemporal remote sensing images (images collected without being in direct contact with features of interest; normally earth observation from aircraft and satellite platforms but also observation of other features from ground based cameras, telescopes, microscopes, and medical imaging equipment) on a frame-by-frame basis to that nearly identical viewing geometry enables precise co-registration. The present application also relates, in some embodiments to methods of collecting and processing multi-temporal image sets using image station matching and spatial co-registration (or other means of image alignment) for enabling automated detection of moving objects with high frequency imaging. Remotely sensed images may be captured from any platform, any camera system (e.g., sensor), any position, with any viewing perspective, of any scene, at any scale, and/or at any time. The methods and devices disclosed herein can be used in, for example, imaging applications including earth surface remote sensing, astronomy, microscopy, and medical imaging.

BACKGROUND

Image registration is utilized to transform a subject image so that it is geometrically aligned with a reference image and may generally include three steps: 1) feature matching, 2) transform model estimation, and 3) image resampling and transformation (Wyawahare, M. V., P. M. Patil, and H. K. Abhyankar. 2009. Image registration techniques: an overview. International Journal of Signal Processing, Image Processing, and Pattern Recognition, 2(3): 11-28; Zitova, B. and J. Flusser. 2003. Image registration methods: a survey. Image and Vision Computing, 21: 977-1000). In some embodiments, feature matching identifies corresponding image coordinate sets between the images that may be used to estimate the transformation model. In some embodiments, transformation model estimation is the process of estimating and possibly fine-tuning the transformation model in order to achieve accurate image co-registration. The derived transformation model may be the best estimate given available calibration information, and each observed control point (e.g., calibration point) is likely to have some level of residual error. Once a final transformation model is attained, the subject image may be transformed and resampled (converting subject image pixel values from the subject image grid to the reference image grid).

Feature-based matching may include feature detection with subsequent matching of detected features. In some embodiments, feature detection is the process of identifying specific image features and characterizing these features using a range of possible descriptors. Feature selection may be based upon the characteristics of regions, edges, contours, line intersections, corners, etc. Feature matching generally utilizes a variety of information to compare image feature characteristics between image sets to identify feature pairs that meet specified matching criteria. Image coordinates from successfully matched feature pairs may be utilized to co-register the images.

For feature-based matching, the spatially invariant feature transform (SIFT) is a descriptor routine that has been widely used. SIFT generates a large number of feature points per image, and uses 128 unique feature descriptors in order to achieve robust matching of individual features between the subject and reference image. Since it was first proposed, variations on the SIFT routine have been published. Other feature-based descriptors include Gaussian derivatives, moment invariants, and shape context. Matching features may be accomplished based on either feature descriptors or spatial relationships. Feature based methods robustly handle images with intensity and geometric distortion differences, but they may yield too few or unevenly distributed matched points.

Area-based matching generally includes the comparison of local windows of image digital number (DN) values. These values could be based upon original image intensity or transformed image products. Area-based matching skips the feature detection step and directly searches for matching characteristics between pixel values of the subject and reference images. Area-based matching methods include: cross-correlation, least squares, mutual information, Fourier, maximum likelihood, statistical divergence, and implicit similarity matching. Area-based methods generally require initial, coarse alignment between images. Area-based methods yield sub-pixel matching accuracy, but may be less effective than feature-based approaches for images with repeating textures, illumination differences, or image distortions. Further, area-based methods also may not be appropriate for images collected from different locations and having wide baselines.

Transformation model estimation may include selecting a transformation model based upon the method of image acquisition, the assumed geometric deformation, and the required accuracy of the registration (Zitova, B. and J. Flusser. 2003. Image registration methods: a survey. Image and Vision Computing, 21: 977-1000). Global transformation models (single model applied across entire images) include affine, projective, polynomial-based approaches, each of which is applicable for specific situations (Zitova, B. and J. Flusser. 2003. Image registration methods: a survey. Image and Vision Computing, 21: 977-1000). Bivariate polynomial models enable simple rotation, translation, and scaling. Affine models may be appropriate for registration of image scenes acquired from different viewing perspectives, if a perfect (e.g., pin-hole) camera is used, the camera is far from the scene imaged, and the surface imaged is flat. When the camera is close to the scene, then projective models are appropriate in order to handle scale changes from one edge of the scene to the other. For scenes with complex distortions (e.g., high terrain relief viewed from aerial sensors), second or third order polynomial models may be more appropriate (Zitova, B. and J. Flusser. 2003. Image registration methods: a survey. Image and Vision Computing, 21: 977-1000). Local transformation models may include piecewise linear and piecewise cubic mapping (Zitova, B. and J. Flusser. 2003. Image registration methods: a survey. Image and Vision Computing, 21: 977-1000). Local models may be appropriate when distortions vary over short distances. Local models may require a large number of accurate control points in order to generate local transformations.

Transformation of the subject image to match the positioning and inherit the grid of the reference image may require the subject image to be resampled. In some embodiments, resampling is the digital process of estimating new image pixel values from the original image pixel values when the image grid position or size is changed (Parker, J. A., R. V. Kenyon, and D. E. Troxel. 1983. Comparison of interpolating methods for image resampling. IEEE Transactions on Medical Imaging, MI-2(1): 31-39). Depending upon the interpolation method used, original DN values or modified DN values result. Resampling methods include: nearest neighbor, bilinear interpolation, bicubic functions, etc. (Zitova, B. and J. Flusser. 2003. Image registration methods: a survey. Image and Vision Computing, 21: 977-1000)

Image acquisition procedures that enable precise spatial co-registration between multi-temporal aerial image frames are described in (i) Coulter et al., A Frame Center Matching Technique for Precise Registration of Multitemporal Airborne Frame Imagery, IEEE Transactions on Geoscience and Remote Sensing, Vol. 41, No. 11, pp. 2436-2444, November 2003, and (ii) Stow et al., A frame center matching approach to registration for change detection with fine spatial resolution multi-temporal imagery, Int. J. Remote Sensing, Vol. 24, No. 19, pp. 3873-3879, May 2003. Traditional approaches do not attempt to match image capture stations between collections and do not perform image co-registration between images from the same camera stations first, before other processes such as geo-referencing.

Nadir viewing images are acquired with the camera pointing vertically (e.g., directly below the platform). Oblique images are characterized as images that are purposefully collected with off-nadir viewing angles (e.g., camera is tilted up away from nadir). Obliques are characterized as high oblique (showing the horizon within the photo) and low oblique (not showing the horizon). Oblique images are utilized in Google Maps images (when zoomed in far enough in urban areas) and Bing Maps aerial images, as they enable viewing of the sides of buildings and provide a unique perspective. Oblique images also are useful for such things as earthquake damage assessment, since "pancaking" of multi-level buildings would be apparent in oblique images but might not be apparent in nadir-viewing images. As can be seen from Google Maps or Bing Maps, oblique viewing images provide information and detail that is not available from nadir viewing images (building height, building condition, building use, etc.).

Currently, oblique images are collected and utilized, but are not directly compared for change detection. Instead, orthorectified, nadir viewing imagery is used for change detection, after which corresponding oblique images that were acquired in an ad hoc manner are found (e.g., without attempting to match image stations) before and after earth surface changes have occurred to visualize change features.

SUMMARY

A specific method for collecting and processing remotely sensed imagery is utilized to achieve precise spatial co-registration (e.g., matched alignment) between multi-temporal image sets. Such precise alignment or spatial co-registration of imagery is a preprocessing step for change detection, image fusion, and temporal analysis/modeling. Using the approach, multi-temporal aerial or satellite images are collected so that the imaging platform repeats the exact same flight line (in the case of aerial sensing) or same orbit (for satellite sensing) and collects image data from the same image stations (e.g., the sensor returns to the same absolute horizontal and vertical position for repeat imaging, with some minimal level of error) and views the same scene or ground extent.

Further, images are processed in such a way that individual image frames or line arrays from corresponding photo stations are matched, co-aligned and analyzed to detect and/or characterize change. The technique is appropriate for remotely sensed imagery, collected with nadir (e.g., vertical, straight down) viewing perspective or with an oblique (to the side) viewing perspective.

A methodology for automated detection of moving objects within a scene using a time sequence of remotely sensed imagery collected and processed using the techniques described above is a further embodiment. The specialized image collection and preprocessing procedures described above are utilized to precisely co-register a time series of image frame sets, and a novel change detection technique is employed to automate the detection of moving objects. The approach has a wide variety of applications using nearly any camera system, from any platform, at any location, with any viewing perspective, at any scale. Applications include military battlefield monitoring (equipment, enemy personnel, improvised explosive devise installation), border monitor (illicit activity such as smuggling and illegal immigration), wildlife tracking, astronomy (Earth crossing asteroids, etc.), microbiology (e.g., counting multiplying cells), and medical imaging (e.g. X-ray, MRI, etc.).

This methodology has been developed for airborne image-based detection of objects moving on the ground (people, vehicles, animals, etc.). However, the approach is also applicable to ground-based sensing systems viewing terrain (e.g., military viewing an area from a hilltop to see if the enemy is approaching) ground-based systems viewing upward toward space (e.g., astronomy), or ground-based systems analyzing micro-scale features. In an embodiment, some components of the system include 1) frequent, high temporal resolution imaging, 2) coordinated image capture from the same camera station/viewpoint and viewing the same scene, 3) achieving precise spatial alignment (image registration or co-registration) between images, 4) achieving (or verifying) precise radiometric alignment between images so that brightness values are comparable, and 5) using the spatially registered time series of imagery to determine what image response is expected from each pixel within the scene, and then to search for image responses (brightness values, etc.) in newly acquired images that are beyond the expected range, indicating detection of a new or changed feature within the scene.

Some embodiments disclosed herein include a method for aligning multi-temporal airborne, satellite, ground-based, microscope, medical, astronomy, or other remotely sensed imagery, the method comprising: (a) capturing a first image from a location at a first time point; (b) capturing a second image from about the same location at a second time point; (c) matching points on the second image that correspond to points on the first image; and (d) applying a transformation to the second image based on the matching points to align the second image to the first image, wherein at least one of steps (a) through (d) are performed by a processor.

In some embodiments, at least three points are matched between the first image and the second image. In some embodiments, more points are matched between the first and second images (e.g., about 10 to about 30 points). In some embodiments, an even greater number of points may be matched (>50 points).

In some embodiments, the transformation comprises a projective or second-order polynomial.

In some embodiments, the first time point is at least milliseconds apart from the second time point. In some embodiments, the time period between the first and second time points may be much greater (e.g., 10 minutes or more).

In some embodiments, the first image is captured using the same imaging device as for capturing the second image. In other embodiments, the first and second images may be captured using different imaging devices.

In some embodiments, the second image is captured under approximately the same lighting conditions as the first image.

In some embodiments, a method for aligning multi-temporal airborne, satellite, or ground-based remotely sensed imagery, includes: (a) capturing a first image from a location at a first time point; (b) moving the imaging sensor away from the location; (c) returning the imaging sensor to the same location at a later point in time in order to precisely replicate the view geometry between the sensor and each static/non-moving element within the scene/ground extent; (d) capturing a second or additional images of the same scene (e.g., ground extent) from about the same location at later points in time; (e) selecting one of the multitemporal images to be the master image for geometric alignment; (f) matching points on slave image(s) that correspond to points on the master image; and (g) applying a transformation to the slave image(s) based on the matching points to align the slave image(s) to the master image, wherein at least one of steps (a) through (g) are performed by a processor.

In some embodiments, individual images captured from about the same location are co-registered and aligned on an image-by-image basis. In other embodiments, e.g. in the case of 2-dimensional frame array images, the images are aligned on a frame-by-frame basis.

Some embodiments disclosed herein include a method for detecting changes in one or more image scenes for a region comprising: (a) capturing three or more sequential reference images of a region from nearly the same location; (b) spatially aligning the reference images to obtain spatially aligned reference images; (c) determining temporal distributions of brightness values and/or local spatial texture values on a per-pixel basis for the spatially aligned reference images; (d) capturing a subject image of the same region from about the same location; (e) spatially aligning the subject image with the spatially aligned reference images; (f) determining unique thresholds for maximum brightness value, minimum brightness value, and/or maximum local spatial texture value on a per-pixel basis based on the temporal distributions of brightness values and/or local spatial texture values for the spatially aligned reference images; and (g) identifying one or more pixel-level changes when one or more pixels in the spatially aligned subject image exceeds one or more of the pre-determined thresholds for maximum brightness, minimum brightness, or maximum local spatial texture value, wherein at least one of steps (a) through (g) are performed by a processor.

In some embodiments, determining temporal distributions of brightness values and/or local spatial texture values on a per-pixel basis for the spatially aligned reference images comprises determining a temporal mean and standard deviation of brightness values and/or local spatial texture values on a per pixel basis for the spatially aligned reference images.

In some embodiments, the unique threshold for the maximum brightness on a per-pixel basis is a sum of the mean brightness and a multiple of the standard deviation of the brightness.

In some embodiments, the unique threshold for the minimum brightness on a per-pixel basis is a sum of the mean brightness and a multiple of the standard deviation of the brightness.

In some embodiments, the unique threshold for the maximum local spatial texture value on a per-pixel basis is a sum of the mean local spatial texture value and a multiple of the standard deviation of the local spatial texture value.

In some embodiments, spatially aligning the subject image with the spatially aligned reference images comprises: matching points on the subject image that correspond to points on the spatially aligned reference images; and applying a transformation to the subject image based on the matching points to spatially align the subject image to the spatially aligned reference images.

In some embodiments, at least three points are matched between the subject image and the spatially aligned reference images. In some embodiments, more points are matched between the subject and reference images (e.g., about 10 to about 30 points). In some embodiments, an even greater number of points may be matched (>50 points).

In some embodiments, the transformation comprises a projective or second-order polynomial.

In some embodiments, the three or more reference images are captured at approximately the same time of day or with approximately the same scene illumination conditions at any time of day, which could include the use of artificial illumination such as that of radio detection and ranging and light detection and ranging.

In some embodiments, the local spatial texture value for a pixel is a standard deviation of pixel values in 3×3 window of pixels centered on the pixel.

In some embodiments, the reference images are aerial images, satellite images, astronomy images, medical images, or microscope images.

In some embodiments, the method further comprises performing radiometric alignment of the spatially aligned reference images before determining the temporal distributions.

In some embodiments, identifying one or more pixel-level changes comprises identifying change when the subject image pixel value exceeds the most extreme pre-determined threshold for all 25 pixels within a 5×5 window centered on the pixel of interest for maximum brightness, minimum brightness, or maximum local spatial texture value.

Alternatively, in some embodiments, identifying one or more pixel-level changes comprises identifying one or more pixel-level changes when at least two pixels within 5×5 window or a 3×3 window exceed one or more of the pre-determined thresholds for maximum brightness, minimum brightness, or maximum local spatial texture value.

In some embodiments, a pixel that exceeds two or more of the pre-determined thresholds for maximum brightness, minimum brightness, and/or maximum local spatial texture value are merged into a single pixel-level change.

In some embodiments, a pixel-level change is identified when a majority of pixels in a window exceed one or more the pre-determined thresholds. In some embodiments, no pixel-change is identified when the majority of pixels within a window do not exceed one or more pre-determined thresholds.

In some embodiments, a method for detecting changes in one or more image scenes for a region includes: (a) capturing three or more sequential reference images of a region from nearly the same location; (b) spatially aligning (or verifying spatial alignment between) the reference images to obtain spatially aligned reference images; (c) radiometrically aligning the reference images (or verifying radiometric alignment of the reference images); (d) determining temporal distributions of brightness values and/or local spatial texture values on a per-pixel basis for the spatially and radiometrically aligned reference images; (e) capturing a subject image of the same region from about the same location; (f) spatially aligning (or verifying spatial alignment between) the subject image and the spatially aligned reference images; (g) radiometrically aligning the subject image with the reference images (or verifying radiometric alignment of the subject image with the reference images); (h) determining unique thresholds for maximum expected brightness value, minimum expected brightness value, and/or maximum expected local spatial texture value on a per-pixel basis based on the temporal distributions of brightness values and/or local spatial texture values for the spatially and radiometrically aligned reference images; and (i) identifying one or more pixel-level changes when one or more pixels in the spatially aligned subject image exceeds one or more of the pre-determined thresholds for maximum brightness, minimum brightness, or maximum local spatial texture value, wherein at least one of steps (a) through (i) are performed by a processor.

Some embodiments disclosed herein include a system for detecting a change in a region, the system comprising: one or more processors; an imaging device in communication with at least one of the processors and configured via at least one of the processors to capture a subject image of a region and send the subject image to at least one of the processors; and a navigation system in communication with at least one of the processors and configured to provide at least one of the processors an approximate location of the imaging device, wherein at least one of the processors is configured to send a signal to the imaging device to capture the subject image of the region when the imaging device reaches a pre-determined location, and wherein at least one of the processors is configured to perform the following: receive the subject image of the region from the imaging device, wherein the subject image is captured from the pre-determined location; spatially align the subject image with one or more pre-existing reference images of the same region that were captured from the same pre-determined location to obtain spatially aligned images; and determine that a pixel in the subject image has changed relative to the pre-existing reference images because a brightness value or local spatial texture values exceed one or more per-pixel threshold values that are based on temporal mean and standard deviation values calculated from the pre-existing reference images.

In some embodiments, the system further comprises a computer-readable storage medium having data stored thereon and in communication with at least one of the processors, where the data comprises: two or more locations for capturing images of different regions; one or more spatially aligned images for each of the different regions; and temporal average and standard deviation values calculated for brightness and/or local spatial texture for each corresponding pixel in the spatially aligned reference images for each of the different regions.

In some embodiments, at least one of the processors is further configured to perform radiometric alignment of all reference and subject images before computing summary statistics or detecting changes between in the subject image.

In some embodiments, the imaging device is a digital camera or other imaging device (e.g., RADAR, LIDAR, ultrasound, etc.).

In some embodiments, the pre-determined, user defined, or automatically determined threshold values for each pixel are represented as a value that is multiplied times the standard deviation of brightness or texture values and added to the mean of brightness or texture values, respectively, for each corresponding pixel in the reference images.

In some embodiments, the imaging device is configured for aerial, satellite, ground-based, microscope, telescope, or other imaging.

Some embodiments disclosed herein include non-transitory computer-readable medium having instructions stored thereon for execution by a processor to provide a method for detecting changes in a region, the method comprising: (a) capturing three or more reference images of a region from a location; (b) spatially aligning the reference images to obtain spatially aligned reference images; (c) determining an average temporal brightness or local spatial texture and standard deviation of temporal brightness or local spatial texture for each pixel in the spatially aligned reference images that correspond to a common portion of the region; (d) capturing a subject image (which could be part of the reference image set) of the same region from the same location; (e) spatially aligning the subject image with the spatially aligned reference images; (f) identifying a change in the region by determining if a brightness or local spatial texture value of each pixel in the spatially aligned subject image is less than the average times a specified value times the standard deviation (in the case of brightness decrease) or is greater than the average times a specified value times the standard deviation (in the case of brightness or local spatial texture increase), where temporal average and standard deviation values are derived from the spatially aligned reference images.

BRIEF DESCRIPTION OF THE DRAWINGS

The accompanying drawings, which are incorporated in and constitute a part of the application, illustrate example embodiments and, together with the application, serve to explain the objects, advantages, and principles of the application.

DETAILED DESCRIPTION

Figure 1A:
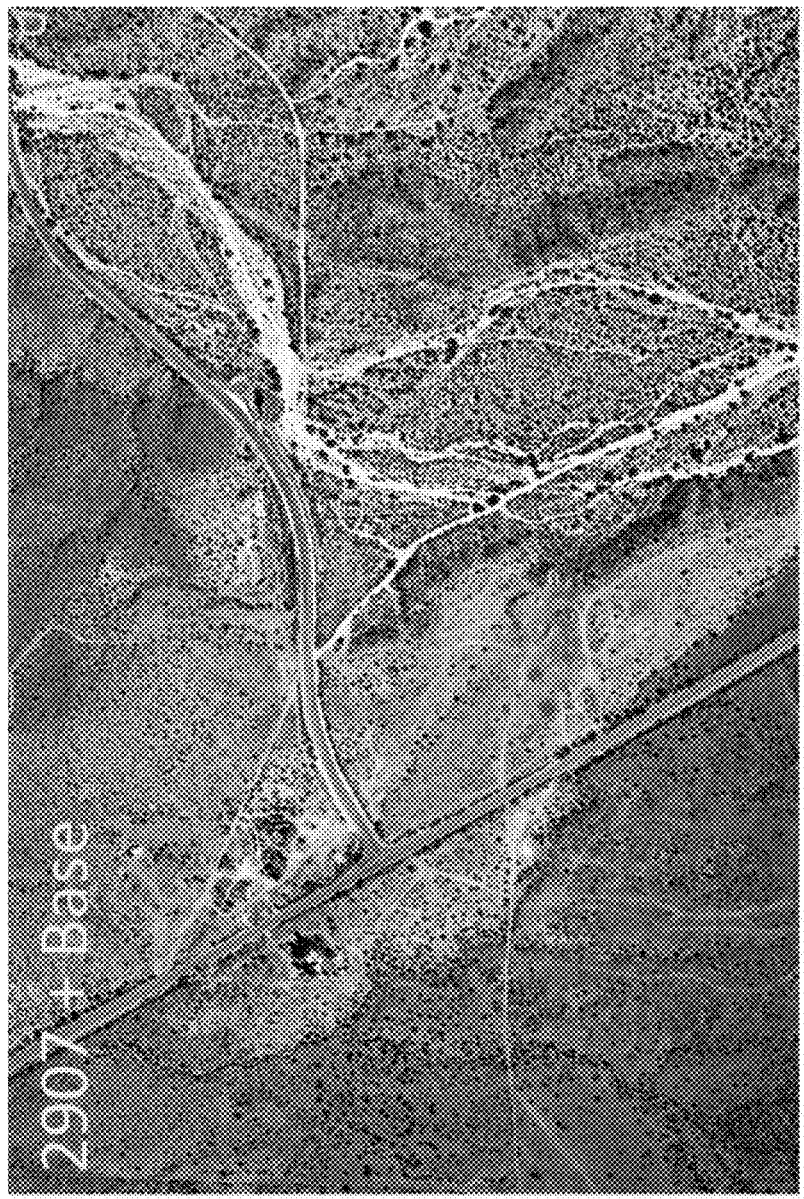
FIG. 1A illustrates an example of a first image.

After reading this description it will become apparent to one skilled in the art how to implement the various embodiments and alternative applications described herein. It is understood that the embodiments presented here are presented by way of an example only, and not limitation. As such, this detailed description of various alternative embodiments should not be construed to limit the scope or breadth of the present application as set forth below.

I. Image Matching and Co-Registration

The approach can include specific image collection and processing techniques. The approach has not been considered or utilized for co-registration of nadir and oblique viewing images. The technology significantly improves change products at reduced cost when compared to traditional image processing techniques. Costs can be reduced due to the simplicity of the approach, since the traditional requirements of human input, terrain (or other 3-dimensional feature) data, surveyed ground control and complicated algorithms for image registration based on earth-sensor geometric correction approaches are unnecessary. In some embodiments described herein, multi-temporal images may be aligned automatically using routines to find matching control points (features common between two images) and applying existing simple warping functions (such as projective or second-order polynomial). This approach can include matching the imaging sensor position and viewing angles regardless of the platform or sensor type/orientation.

Image acquisition procedures that enable precise spatial co-registration between multi-temporal image frames are described in Coulter et al., A Frame Center Matching Technique for Precise Registration of Multitemporal Airborne Frame Imagery, IEEE Transactions on Geoscience and Remote Sensing, Vol. 41, No. 11, pp. 2436-2444, November 2003, and Stow et al., A frame center matching approach to registration for change detection with fine spatial resolution multi-temporal imagery, Int. J. Remote Sensing, Vol. 24, No. 19, pp. 3873-3879, May 2003, the contents of which are both incorporated herein by reference in their entirety. As used herein, spatial co-registration is the alignment of two separate images to match each other. The approach that has been referred to as frame center (FC) matching when implemented with digital frame cameras (with 2-dimensional arrays), is based upon matching sensor stations in terms of horizontal and vertical (e.g., altitude) position between multi-temporal image acquisitions. Matching image stations for airborne and satellite imaging can be accomplished through the use of Global Positioning System (GPS) technology (or similar global navigation systems) to aid a piloted or unpiloted aircraft in maintaining the desired track and altitude, and automatically trigger image capture at the same sensor station previously visited during the first imaging pass.

Four specific tools may be used for operational image station matching of airborne or satellite images using GPS data: 1. GPS for logging and digitally archiving flight line and frame center coordinates for each image acquisition. 2. Flight planning software integrated with digital coordinates of flight line and frame coordinates from previous image dates. 3. In-flight, heads-up display enabling pilot to maintain flight line course and altitude (based on GPS coordinates)—only for piloted airborne imaging systems. 4. Automatic triggering of image frames or line arrays (based on digitally archived coordinates and in-flight GPS).

When multi-temporal images of a scene are captured from about the same imaging station between multi-temporal acquisitions, there will be little or no parallax between the images, and they may exhibit the same or similar terrain (or 3-dimensional structure) related geometric distortions such as relief displacement. Further, the relative spatial position of features within the images can be consistent between image sets (e.g., no local distortion differences) and the individual image frames may be precisely co-registered using simple geometric warping functions (e.g., projective or second order polynomial).

A second component of the approach is that FC matched images are spatially co-registered on a frame-by-frame or line-by-line basis (in the case of a linear imaging array) so that the benefits of similar viewing geometry are maintained during image registration and subsequent processing. The present process matches the viewpoint for each image frame (e.g., 2-dimensional picture) or line (e.g., 1-dimensional picture). Doing this replicates the view geometry of the first image, and spatial co-registering images is significantly simplified since there are little or no distortion differences between images. Rather than referencing images to a common coordinate system (e.g., georeferencing/orthorectifying and assigning real world coordinates to each image pixel) and mosaicking image sets individually for each multi-temporal acquisition and then aligning the two image mosaics, the image station matching approach first spatially co-registers and aligns station matched image frames (or lines in the case of a linear imaging arrays), then each aligned image set is subjected to the same subsequent processing for georeferencing and mosaicking (if these subsequent steps are required).

Aligning the images using traditional methods (e.g., georeferencing/orthorectifying in the case of satellite or aerial images) generally requires that the images be very accurately positioned with all spatial distortions (terrain, vegetation, or building-related) removed, which is a complicated process requiring time, terrain/vegetation/building structure information, and surveyed ground control (in the case of aerial/satellite images). Using the station matching approach, the images are aligned (co-registered) first, and then further processing (e.g., geo-referencing) may be applied if desired. For a large number of applications, only crude absolute positioning is required, which means that after images are spatially co-registered, only a certain level of positional accuracy needs to be achieved. In some cases, information about position and attitude calculated by sensors on-board an aircraft (e.g., using global positioning systems and inertial measurement units) is sufficient to crudely position the imagery, which enables automated georeferencing (direct georeferencing).

Following multi-temporal image collection, matched station image sets can be identified so that they may be spatially co-registered prior to any other processing or analysis. For aerial and satellite images, this may be accomplished in an automated fashion using GPS data collected for each image frame. The general accuracy of non-differentially corrected GPS positions is +/−10 m. Therefore, matched image stations between multi-temporal imaging passes may be expected to be within +/−20 m (plus a few extra meters for timing errors associated with GPS-based camera triggering). Positions of individual imaging stations are likely to be hundreds of meters apart, so determining which images belong to which sensor station is trivial.

Further, services like the Wide Area Augmentation System (WAAS) may also be used to differentially correct the GPS data and further reduce errors. Once station matched images are automatically identified, these images are co-registered using automated image spatial co-registration techniques. Image registration involves geometrically or spatially aligning two or more images so that they may be compared or utilized together. Image registration has a wide range of application fields. In the context of remote sensing, image registration is often used to prepare airborne or satellite imagery for change detection, image classification, and image fusion.

Image registration in general is utilized to transform a subject image so that it is geometrically aligned with a reference image and may generally include three steps: 1) feature matching, 2) geometric transform (e.g., warping) model estimation, and 3) image resampling and transformation. Feature matching may identify corresponding image coordinate sets between the images that may be utilized to estimate the transformation model. Feature matching may be accomplished using feature-based, area-based or human-delineated approaches. In some embodiments, transform model estimation is the process of estimating and possibly fine tuning the transformation model in order to achieve accurate image registration. The derived transformation model is the best estimate given available information, and each observed control point is likely to have some level of residual error compared to the model. When determining residual error, it may be difficult to separate the locational error of the GCP versus the error in the transformation model that may incompletely represent the distortion surface. Once a final transformation model is attained, the subject image may be transformed and resampled (converting subject image pixel values from the subject image grid to the reference image grid).

This non-traditional approach exploits basic geometric principles to enable rapid and precise alignment of images using simple techniques. Traditional approaches do not attempt to match image capture stations between collections and do not perform image co-registration between images from the same camera stations first, before other processes such as geo-referencing. In some embodiments, only matching points have to be identified and existing, basic warping functions applied. Existing techniques require human involvement, surveyed ground control, terrain, or other three-dimensional (e.g., horizontal and vertical) control data. Currently, aerial and satellite image sets are orthorectified first to remove terrain/building/vegetation distortions and provide accurate positioning information. Orthorectification is the process of removing all image distortions resulting from view angle, terrain, building height, etc. so that the resulting orthorectified images contain map-like properties (every pixel is located at its correct position on the earth). As is understood, orthorectification results are only as good as the control data utilized in the process. For example, if survey control data from monuments as well as terrain, vegetation and building information (e.g., building 3-D models) are highly accurate, then image orthorectification results will be highly accurate. The problem is that terrain data are often not very accurate (or costs a lot of money to make it accurate) and fully realistic and accurate tree/building models do not exist. Therefore, image orthorectification results often have substantial errors, especially with high spatial resolution imagery.

Once two or more image sets are precisely co-registered, they may then be compared at or near the pixel level. Generating accurately positioned image sets requires surveyed ground control, specialize information about terrain or other 3-dimensional features, and extensive analyst time. For high spatial resolution imagery, achieving precise spatial co-registration is difficult in most cases and impossible in some cases, due to inherent image distortions that are not removed through image orthorectification processing. Image orthorectification often cannot completely remove distortions. Some embodiments described herein don't remove distortions, but rather match distortions exactly between image sets so the multitemporal images are a geometric carbon copy of the reference image and align precisely. This approach has not been utilized with oblique viewing imagery. Further, image station matching has not been utilized by the remote sensing industry for image registration (neither nadir nor oblique).

In some embodiments, software is created to facilitate the image station matching approach. The software may automatically identify images that were acquired from the matched photo (frame center) positions, may automatically co-register the images, and may then georeference the images so that they may be located on the Earth's surface and used with other map layers. Change detection capabilities may be implemented in the software.

For oblique images, the aircraft horizontal rotation (yaw or crab) may be controlled so that oblique images are viewing the same scene between multi-temporal acquisitions. In addition, image distortions resulting from slightly different (mismatched) viewing positions may yield higher magnitude and more variable distortions between multi-temporal images, as oblique images have objects (buildings, etc.) at a range of distances from the viewing point. For line-array systems, stabilization and sensor attitude (view angle) control systems may be used so that image stations and resulting imaged ground locations correspond per sensor station (this is complicated using line array sensors).

Figure 1B:
FIG. 1B illustrates an example of a second image which has been spatially co-registered with the first image.

The images enclosed in the drawings are designed to show just how multi-temporal digital frame camera images can be matched using a few control points and simple warping functions (e.g., $2^{nd}$ order polynomial or projective). FIG. 1A illustrates an example of a first aerial image numbered 2907 with approximately a 10-inch spatial resolution for a desert scene, while FIG. 1B illustrates an example of a second aerial image numbered 2922 acquired by matching the image station of image 2907 using the frame center matching approach. Image 2922 was then precisely spatially matched (co-registered) with the first image 2907 on a frame-by-frame basis and overlayed onto the first image to demonstrate the precise alignment that can be achieved. The quality of the spatial co-registration is apparent when viewing the alignment between the images where they overlap along the right edge. There is almost no misregistration or shifting of the images relative to each other. Generating this level of spatial co-registration would normally be a very involved process. With these images, detection of such things as earthquake damage would be possible.

Figure 2A:
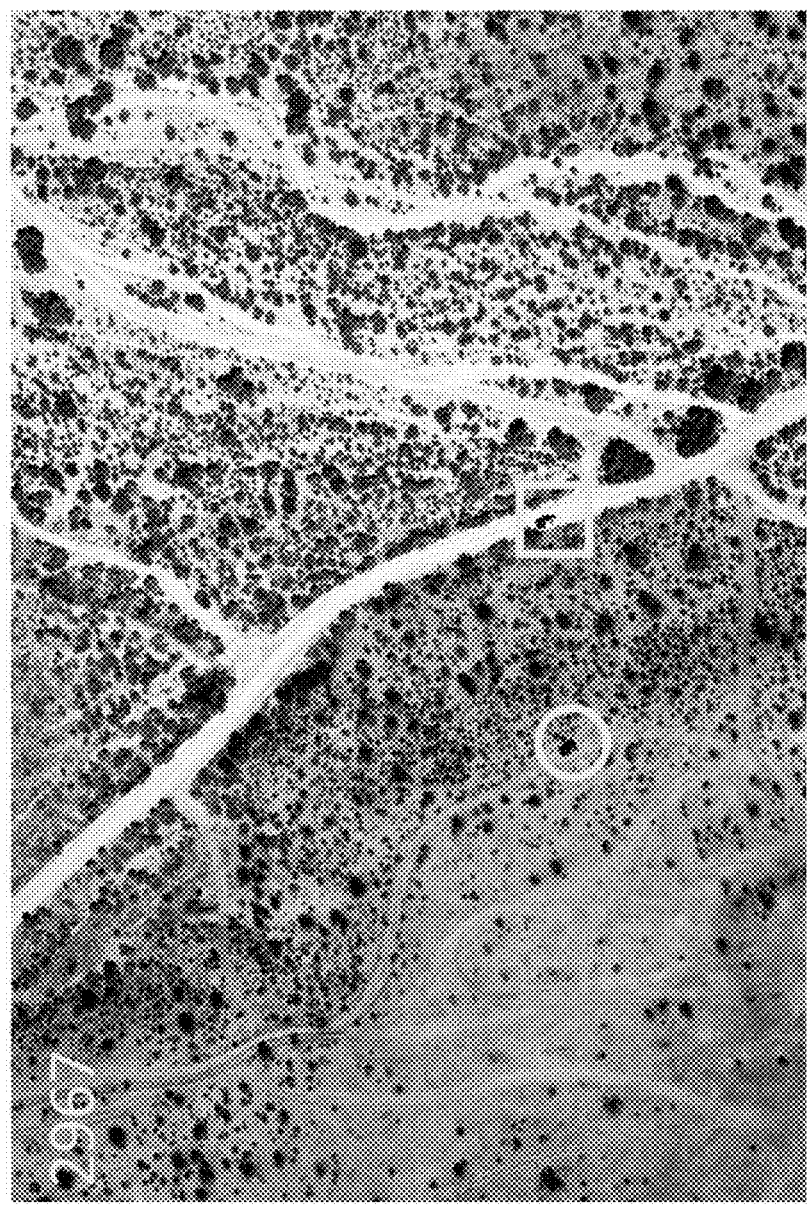
FIG. 2A illustrates an example of a first image.
Figure 2B:
FIG. 2B illustrates an example of a second image which has been spatially co-registered with the first image to demonstrate motion tracking of objects in the first and second images.

FIG. 2A illustrates an example of an aerial image numbered 2967 captured with approximately 2-inch spatial resolution for a desert scene. FIG. 2B illustrates an example of a second aerial image numbered 2985 which was acquired by matching the image station of image 2967 using the frame center matching approach. Image 2985 was then precisely spatially matched (co-registered) with the first image 2967 on a frame-by-frame basis and overlayed onto the first image to demonstrate the precise alignment that can be achieved. The quality of the spatial co-registration is apparent when viewing the alignment between the images where they overlap along the left edge, right edge and bottom edge. The images 2967 and 2985 were captured only minutes apart, which also provides for detection of movement of objects. It is evident that movement of cars would be possible using these images (as noted by the changes in the locations of the objects circled by squares and circles).

Figure 3A:
FIG. 3A illustrates an example of a first image.
Figure 3B:
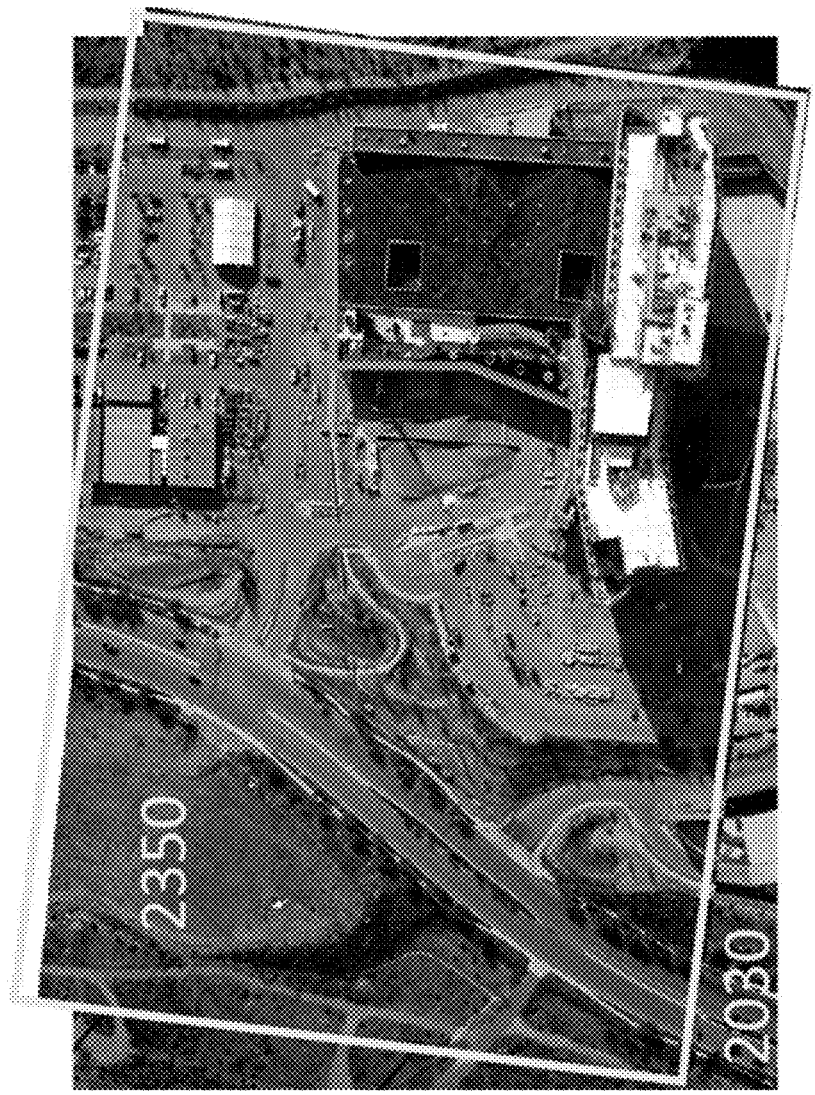
FIG. 3B illustrates an example of a second image which has been spatially co-registered with the first image.
Figure 3C:
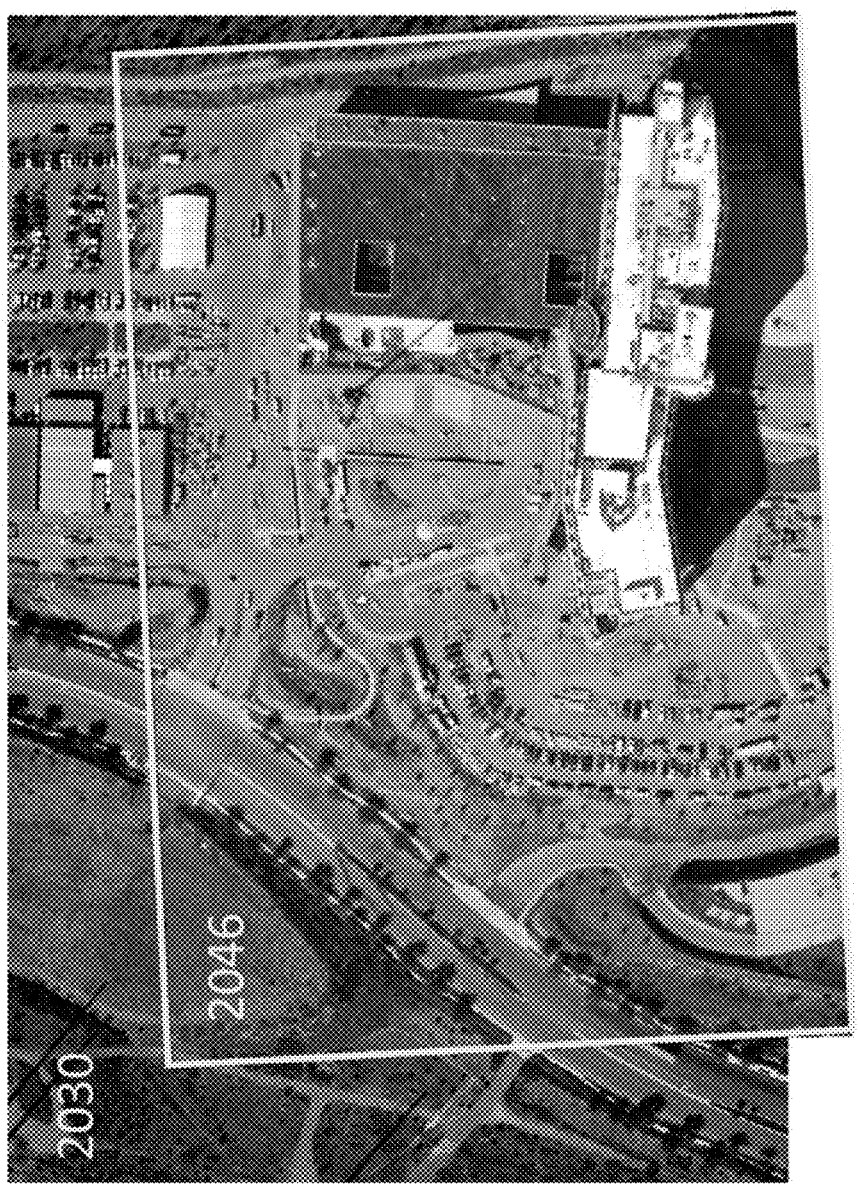
FIG. 3C illustrates an example of a third image which has been spatially co-registered with the first image.

FIG. 3A illustrates an aerial image (2030) captured with an approximately 3-inch spatial resolution, depicting a building under construction. Second aerial image 2350 and third aerial image 2046 in FIGS. 3B and 3C, respectively, represent images acquired by matching the image station of image 2030 using the frame center matching approach. FIG. 3B illustrates how image 2350 was spatially co-registered with image 2030 on a frame-by-frame basis, while FIG. 3C illustrates how image 2046 was spatially co-registered with image 2030 on a frame-by-frame basis. Images 2030 and 2046 were acquired minutes apart in the morning, while image 2350 was acquired in the afternoon on the same day.

Figure 4A:
FIG. 4A illustrates an example of a first image.
Figure 4B:
FIG. 4B illustrates an example of a second image which has been spatially co-registered with the first image.

FIG. 4A and FIG. 4B also illustrate how alignment of images is achieved even when the second image captures a largely different area than the first image. "2120" is an aerial image captured with approximately 3-inch spatial resolution for a single family residential area under construction. "2291" represents a second image which was acquired by matching the image station of "2120" (using the frame center matching approach) and was spatially co-registered to the first (2120) on a frame-by-frame basis. The image "2291" is precisely co-registered to "2120". The quality of spatial co-registration is apparent when viewing the alignment between the images where they overlap. "2120" was captured in the morning, while "2291" was capture in the afternoon when cloud shadows were present within the scene.

Figure 5A:
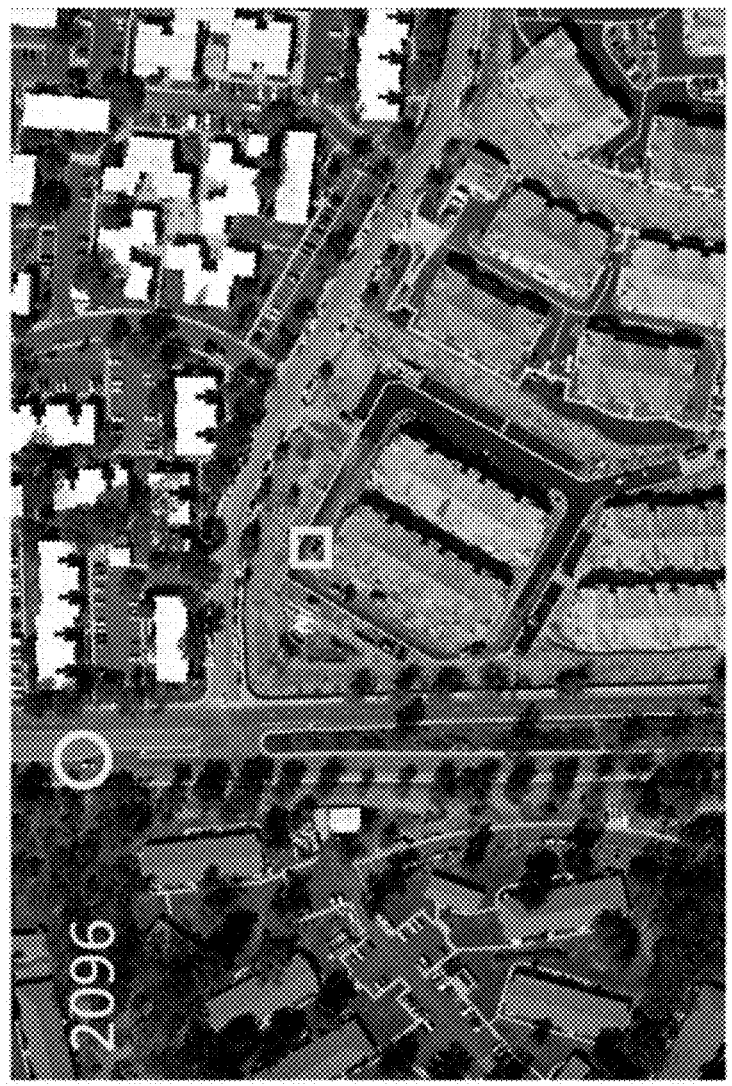
FIG. 5A illustrates an example of a first image.
Figure 5B:
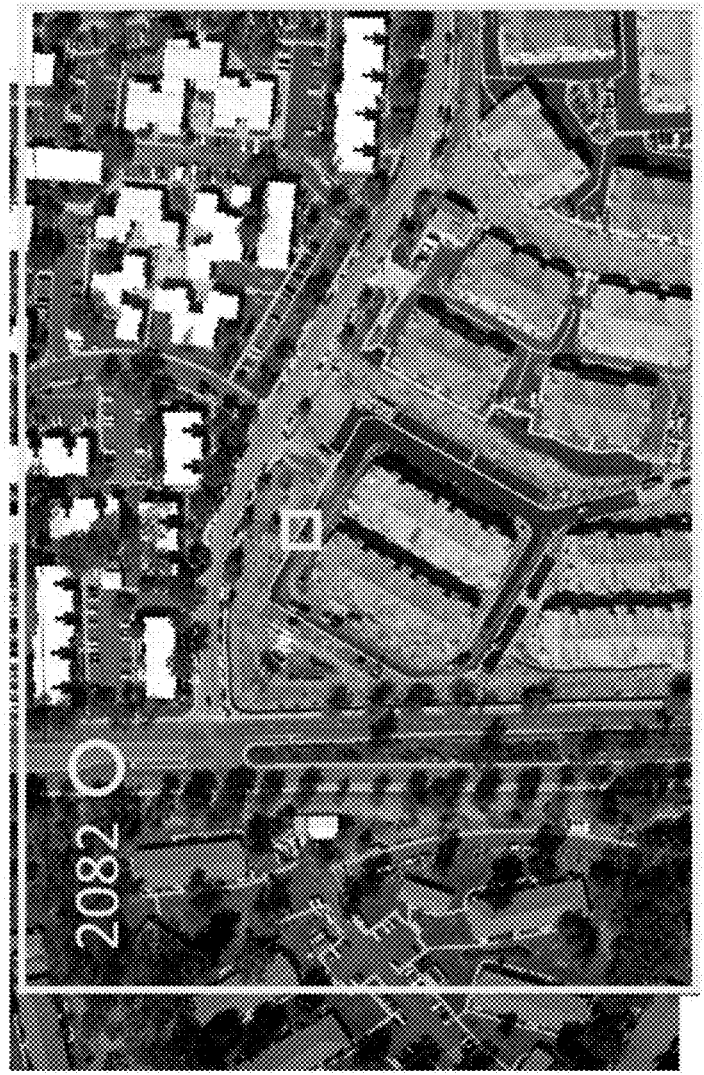
FIG. 5B illustrates an example of a second image which has been spatially co-registered with the first image to demonstrate motion tracking of objects in the first and second images.

FIG. 5A and FIG. 5B illustrate the ability to track even small movements of objects over a small time frame as a result of the ability to precisely align a first and second image taken over a small period of time. "2096" is an aerial image captured with approximately 3-inch spatial resolution for a multi-family residential area under construction. "2082" represents a second image which was acquired by matching the image station of "2096" (using the frame center matching approach) and was spatially co-registered to the first (2096) on a frame-by-frame basis. The image "2082" is precisely co-registered to "2096". The quality of spatial co-registration is apparent when viewing the alignment between the images where they overlap. "2096" and "2082" were acquired minutes apart. These images were captured minutes apart, and movement over time of two vehicles highlighted (circle and box) is apparent.

Applications of Co-Registration

A complete software system for collecting nadir and oblique station matched images, pairing matched images, co-registering matched images, and visualizing changes between multi-temporal image sets may be run to implement the aforementioned methods of spatial co-registration. Such software system may be implemented as modules and executed by a processor. Exploitation of remote sensing imagery can be used for synoptic wide area monitoring and change detection. When multi-temporal remotely sensed images (e.g., airborne or satellite) are precisely aligned, image sets may be used to detect land cover or feature changes of interest for a wide variety of purposes (e.g., natural or anthropogenic damage, personnel or equipment movements, etc.).

The image station matching approach can increase image spatial co-registration efficiency (as the process may be automated and requires less processing load), accuracy (since image distortion differences are not present between image pairs and precise co-registration is readily achieved), and timeliness (as automated processing may be performed in near real-time). Some embodiments described herein are automated by determining which images are from the same camera position, automatically generating matching control points, and warping images so that they are co-registered. Image distortions are identical between image pairs/sets when images are captured from the exact same viewing position. If the station is matched exactly, there are no distortion differences. In addition, the FC matching approach to image spatial co-registration makes near real-time change detection possible by allowing synoptic wide-area monitoring of subtle changes possible in significantly abbreviated timescales. Such applications include damage assessment from earthquakes and near real-time detection of people and vehicles moving across the battlefield or through a border region requiring monitoring.

Nadir viewing images may be acquired with the airborne/satellite based sensor pointing directly downward towards the earth. Oblique images are characterized as images that are purposefully collected with off-nadir viewing angles (e.g., camera is tilted up away from nadir). Obliques are characterized as high oblique (showing the horizon within the photo) and low oblique (not showing the horizon). Oblique images are utilized in Google Maps images (when zoomed in far enough in urban areas) and Bing Maps aerial images, as they enable viewing of the sides of buildings and provide a unique perspective. Oblique images also are useful for such things as earthquake damage assessment, since "pancaking" of multi-level buildings would be apparent in oblique images but might not be apparent in nadir-viewing images. As can be seen from Google Maps or Bing Maps, oblique viewing images provide information and detail that is not available from nadir viewing images (building height, building condition, building use, etc.). Using our image co-registration techniques, changes in these characteristics can be detected and documented over time.

II. Automated Moving Object Detection Using Time Series Images

A methodology for automated detection of moving objects within a scene using a time series of remotely sensed imagery is presented here. Specialized image collection and preprocessing procedures are utilized to obtain precise spatial co-registration (image registration) between multitemporal image frame sets. In addition, specialized change detection techniques are employed in order to automate the detection of moving objects. The approach has a wide variety of applications using nearly any sensor system, from any platform, at any location, with any viewing perspective, and at any scale. Applications include military battlefield monitoring (equipment, enemy personnel, improvised explosive devise installation), border monitor (illicit activity such as smuggling and illegal immigration), wildlife tracking, astronomy (Earth crossing asteroids, etc.), microbiology (e.g., counting multiplying cells), and medical imaging (e.g. X-ray, MRI, etc.).

This methodology has been developed for airborne image-based detection of objects moving on the ground (people, vehicles, animals, etc.) for persistent wide area surveillance. However, the approach is also applicable to ground-based sensing systems viewing terrain (e.g., military viewing an area from a hilltop to see if the enemy is approaching), ground-based systems viewing upward toward space (e.g., astronomy), or ground-based systems analyzing micro-scale features. The components of the system may include: 1) frequent, high temporal resolution imaging, 2) image capture from the same camera station/viewpoint and viewing the same scene, 3) achieving precise spatial alignment (image registration or co-registration) between images, and 4) achieving (or verifying) precise radiometric alignment between images so that brightness values are comparable, and 5) using the spatially registered time series of imagery to understand what image response is expected from each pixel within the scene, and then looking for image responses (brightness values, etc.) in newly acquired images that are beyond the expected range, indicating detection of a new or changed feature within the scene.

The image-based approach for detecting moving objects can be efficient and highly effective, and no evidence has been found of a similar process in existence. The methodology uses well-defined image collection and spatial co-registration (image registration) techniques and simple statistical information from high temporal resolution image data to effectively detect moving objects with little to no false detection (commission error). The approach enables new capabilities for wide area surveillance, and near continuous monitoring of very large geographic extents. By comparison, video-based monitoring systems can only view relatively small ground areas at a time and cannot continuously monitor vast expanses.

Definitions

First, definitions are provided that facilitate description of the approach.

Subject image: the most recent image collected that will be compared against previously collected images in order to detect changes associated with moving objects.

Recent past images: a time series of images acquired within the recent past (e.g., last two weeks) from the same camera station at approximately the same time of day (e.g., within 15-30 minutes). Within the recent past, solar illumination and scene conditions (e.g., shadows) at any given time of day are expected to be similar to those of the subject image.

Local image texture: a quantitative value indicating the variation of pixel values within a local window or neighborhood (e.g., standard deviation of pixel values within a 3×3 window around each pixel).

Texture image: the image created by calculating LOCAL IMAGE TEXTURE values for each pixel.

Implementation

Two key problems may be solved as part of the process. These challenges are aligning images in a rapid and automated way, and detecting changes of interest without false detections. Using the described methodology, images can be aligned in an automated fashion using specific collection (frame center matched acquisition) and processing techniques (e.g., 10-20 matched control points and simple warping transformations such as projective or second order polynomial). Second, change detection is simplified so that only a few key controls (threshold value, blurring (or generalizing) distance to account for misregistration, and filter size to remove isolated occurrences of false detection) are utilized, and can be interactively adjusted if necessary. This is possible because the approach uses a long time series of imagery to characterize static conditions within a scene. This type of high frequency, repeat pass imaging is not a common approach, and similar collection methods and processing methods are not known.

Automated moving object detection may be accomplished by collecting repeat-pass imagery over periods of minutes to hours using remote sensing systems and specific image collection, image processing, and image-based change detection techniques. In some embodiments, there can be four basic steps for automated moving object detection using imagery collected with high temporal frequency: (1) collect multitemporal imagery using specific techniques that enable precise spatial co-registration of multitemporal images; (2) spatially co-register the multitemporal images with high precision; (3) optionally align brightness (radiometric) values between images (if necessary), and (4) perform change detection to identify features of interest that are newly apparent or have moved locations. Details associated with the above steps are described below.

Image-by-Image Analysis

Image co-registration and image-based change detection is performed on an image-by-image basis. No geolocating/georeferencing or mosaicking of images is performed. The advantages to this approach include: 1) ability to spatially co-register images so that they precisely align and can be compared, 2) limited processing is needed to analyze the images for change (since geolocating or mosaicking of images is not necessary).

Image Collection and Spatial Co-Registration

Images are collected and processed in a specific manner that allows automated and precise spatial co-registration (alignment) of multitemporal image frames. Images must be collected from the same horizontal and vertical position. On the ground, this is accomplished by using a tripod or other system to keep or return the camera back to the same position. Image collection preprocessing procedures that enable precise spatial co-registration between multitemporal airborne image frames are described in (i) L. Coulter, D. Stow, and S. Baer, "A frame center matching approach to registration of high resolution airborne frame imagery," IEEE Transactions on Geoscience and Remote Sensing, vol. 41, no. 11, pp. 2436-2444, 2003; (ii) D. Stow, L. Coulter, and S. Baer, "A frame centre matching approach to registration for change detection with fine spatial resolution multi-temporal imagery," International Journal of Remote Sensing, vol. 24, pp. 3873-3879, 2003; (iii) L. Coulter and D. Stow, "Detailed change detection using high spatial resolution frame center matched aerial photography," Proceedings of the 20th Biennial Workshop on Aerial Photography, Videography, and High Resolution Digital Imagery for Resource Assessment, Weslaco, Tex., Oct. 4-6, 2005; (iv) L. Coulter, and D. Stow, "Assessment of the spatial co-registration of multitemporal imagery from large format digital cameras in the context of detailed change detection," Sensors, vol. 8, pp. 2161-2173, 2008; (v) Stow, D., Y. Hamada, L. Coulter, and Z. Anguelova. 2008. Monitoring shrubland habitat changes through object-based change identification with airborne multispectral imagery. Remote Sensing of Environment, 112: 1051-1061; and (vi) Coulter, L. and D. Stow. 2009. Monitoring habitat preserves in southern California using high spatial resolution multispectral imagery. Environmental Monitoring and Assessment, 152:343-356. The approach referred to as frame center (FC) matching in these publications and now referred to as image station matching in this document is based upon matching camera/sensor locations and view orientation in terms of horizontal position and altitude between multitemporal image acquisitions. Matching camera stations is most effectively accomplished through the use of Global Positioning System (GPS) technology (or similar global navigation systems) to aid a piloted or unpiloted aircraft in maintaining the desired track and altitude, and automatically trigger image capture at the same camera station previously visited during the first imaging pass. This is performed for a series of camera stations along a flight path.

Four specific tools may, in some embodiments, be used for operational frame center matching using GPS data: 1. GPS for logging and digitally archiving flight line and frame center coordinates for each image acquisition. 2. Flight planning software integrated with digital coordinates of flight line and frame coordinates from previous image dates. 3. In-flight, heads-up display enabling pilot to maintain flight line course and altitude (based on GPS coordinates); only for piloted airborne imaging systems. 4. Automatic triggering of image frames or line arrays (based on digitally archived coordinates and in-flight GPS). When multitemporal images of a scene are captured from exactly the same camera station between multitemporal acquisitions, there is no parallax between the images, and (since they have the same viewing perspective) they may be expected to exhibit the exact same terrain, building, or vegetation related geometric distortions. Further, the relative spatial position of features within the images is consistent between image sets and the individual image frames may be precisely co-registered in an automated fashion using a small number of control points (e.g., 10-20) and simple geometric warping functions (e.g., perspective or second order polynomial).

Images from matched stations are spatially co-registered on a frame-by-frame or line-by-line basis (in the case of a linear imaging array) so that the benefits of similar viewing geometry are maintained during image registration and subsequent change analysis processing. For airborne or satellite image collection, a system using vehicle positioning information (such as from GPS) is utilized to determine which remote sensing images were acquired from each of the pre-specified camera stations. Once these matches are identified, image spatial co-registration and change detection may be performed on an image-by-image and basis. Details of automated spatial co-registration procedures for airborne images are given in L. Coulter, D. Stow, S. Kumar, S. Dua, B. Loveless, G. Fraley, C. Lippitt, and V. Shrivastava, "Automated co-registration of multitemporal airborne frame images for near real-time change detection," Proceedings of the ASPRS 2012 Annual Conference, Sacramento, Calif., Mar. 19-23, 2012.

Image Radiometric Alignment

In addition to spatially aligning mages, image brightness (radiometric) values may be optionally aligned so that changes in brightness are indicative of true feature changes. In some embodiments, relative radiometric normalization procedures (such as histogram matching) are applied to align brightness values of images utilized for the object detection. To do this, image statistics (such as mean and standard deviation) from common areas between images are utilized to adjust the brightness values of each image so that they match.

Change Detection

For the detection of moving objects in imagery collected with high temporal frequency, a method is utilized which exploits the high temporal resolution to aid discrimination of moving objects from other features that are not of interest (e.g., noise). For most image scenes, static features in the scene will exhibit a range of brightness and local texture (variability between adjacent/neighboring pixels) values. The location and magnitude of these brightness and texture variations depend upon the time of day, as sun angles and associated feature shadows/illumination will vary. In addition, wind may cause features such as bushes and trees to physically move. The challenge then is to determine what brightness values and variations in brightness values are expected for any given location (e.g., pixel) within a scene at a particular time of day, and then look for anything that varies from what is expected. The image-based monitoring system described here utilizes repeat-pass imagery acquired with high frequency, and several images are available that may be used to determine normal/expected brightness values within image scenes. The approach to detecting objects that move over time is described below.

Figure 6:
FIG. 6 illustrates one example of the use of image station matching and co-registration over a series of multi-temporal images to provide automated moving object detection.

FIG. 6 illustrates one embodiment of the use of image station matching and co-registration over a series of multi-temporal images to provide automated moving object detection. Images were collected with high frequency of approximately 9-13 frames for one scene over a 40-55 minute time period. The resulting image frames were precisely co-registered, and the automated moving object detection approach was applied in order to detect changes associated with moving objects. As can be seen in FIG. 6, people and vehicles moving within the scene can be detected with high accuracy—100 percent in this image—using high spatial resolution (3-inch) imagery. Shading in the subset of images indicates detection of movement, as people or vehicles that were not at the current location during a previous image pass. All people and vehicles that moved between image collections were detected, with no false detection (commission error) for the example image sets. Vehicles or people that did not move between imaging passes were not detected as changed.

Figure 7:
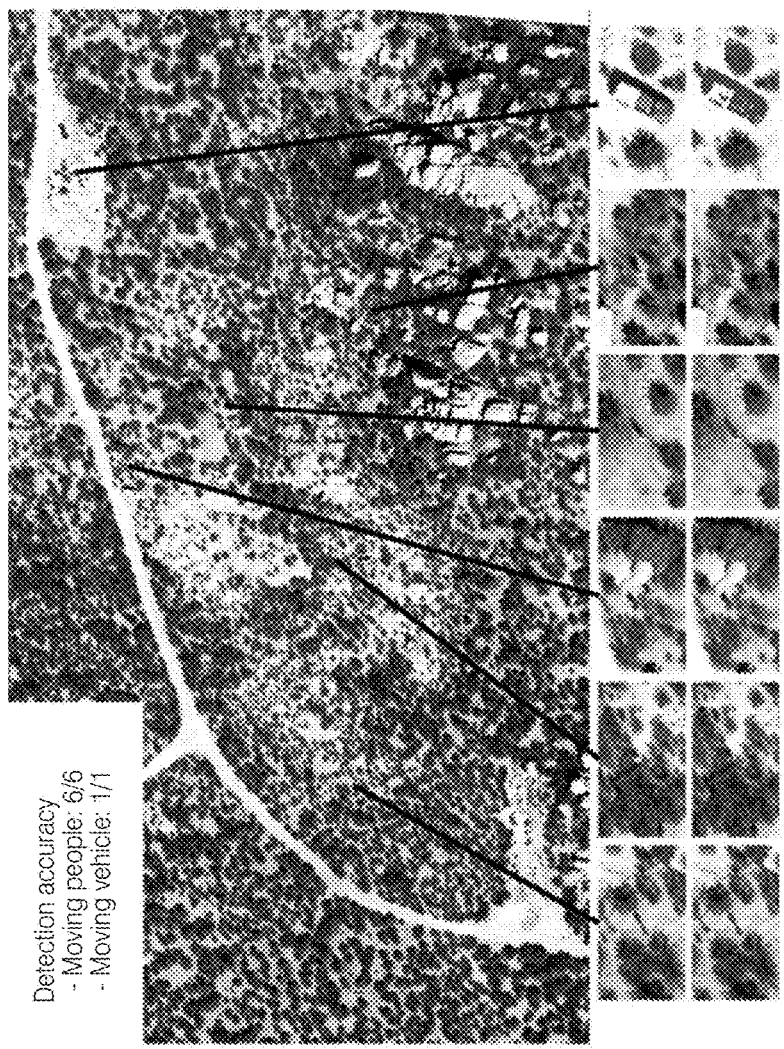
FIG. 7 illustrates another example of multi-temporal images for which the automated moving object detection approach can be used to capture movement of objects.

FIG. 7 illustrates another embodiment of multi-temporal images for which the exemplary automated moving object detection approach can be used to capture movement of objects. The subset of images illustrates the detection of people and vehicles and their movement over the time period of the imaging campaign.

Figure 8:
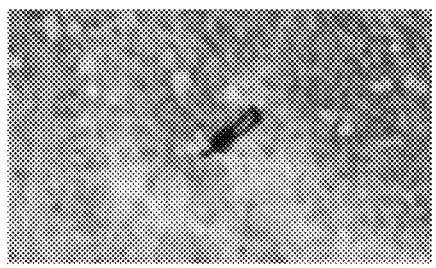
FIG. 8 illustrates detailed images depicting how the body and shadow of an object are detected.
Figure 8:
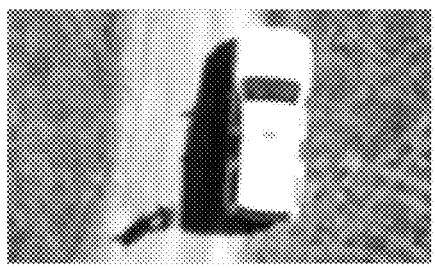
Figure 8:
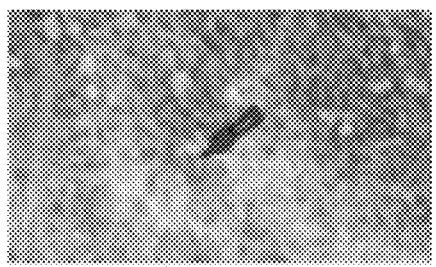
Figure 8:
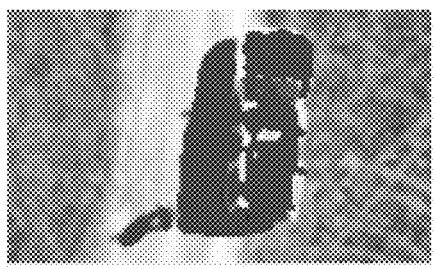
Figure 8:
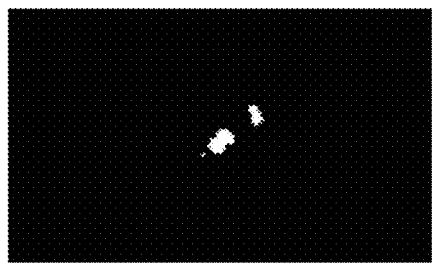
Figure 8:
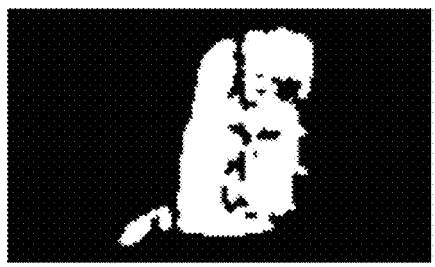

FIG. 8 illustrates detailed images depicting how the body and shadow of an object are detected.

Figure 10:
FIG. 10 illustrates an example of two images that have been spatially co-registered. The second image is displayed with lighter tone to readily show the overlay.

FIG. 10 illustrates an example of two images that have been spatially co-registered using image station matching and frame-to-frame co-registration procedures. The second image is displayed with lighter tone to readily show the overlay.

Exemplary Methods

Figure 11:
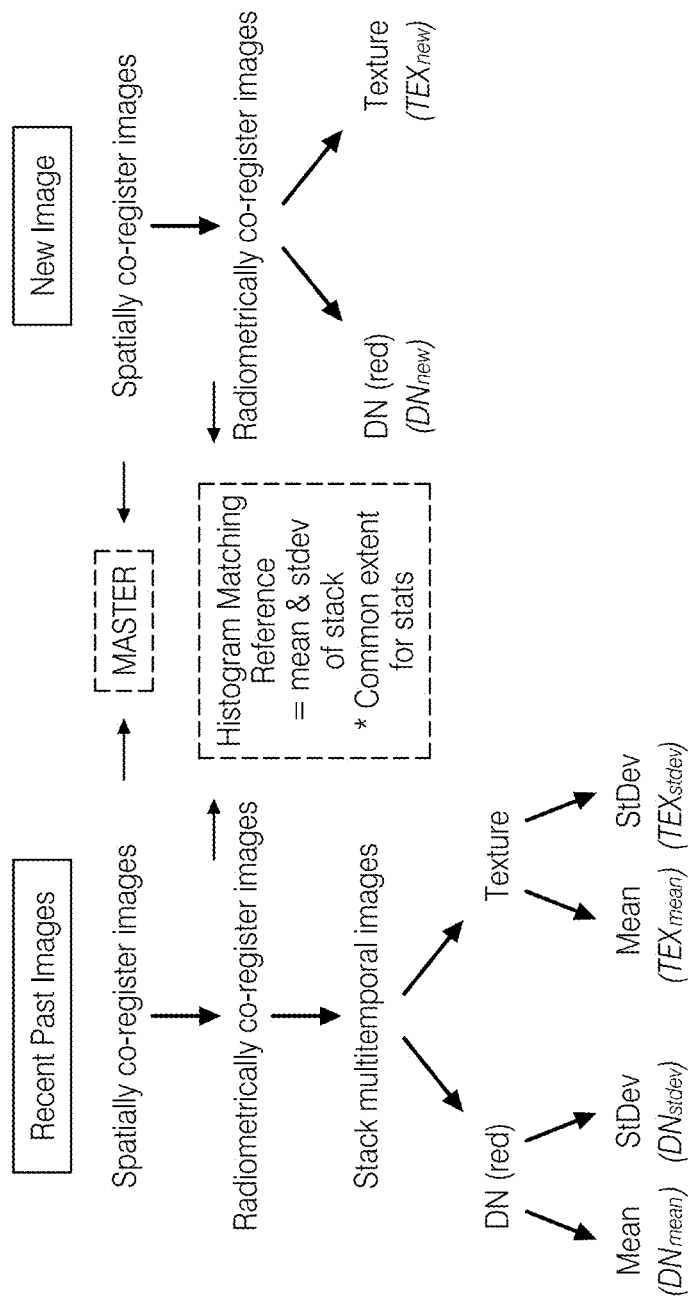
FIG. 11 illustrates a flow diagram showing an example of some operations that that be performed in a method of wide area surveillance. DN in the figure indicates digital number value.
Figure 12:
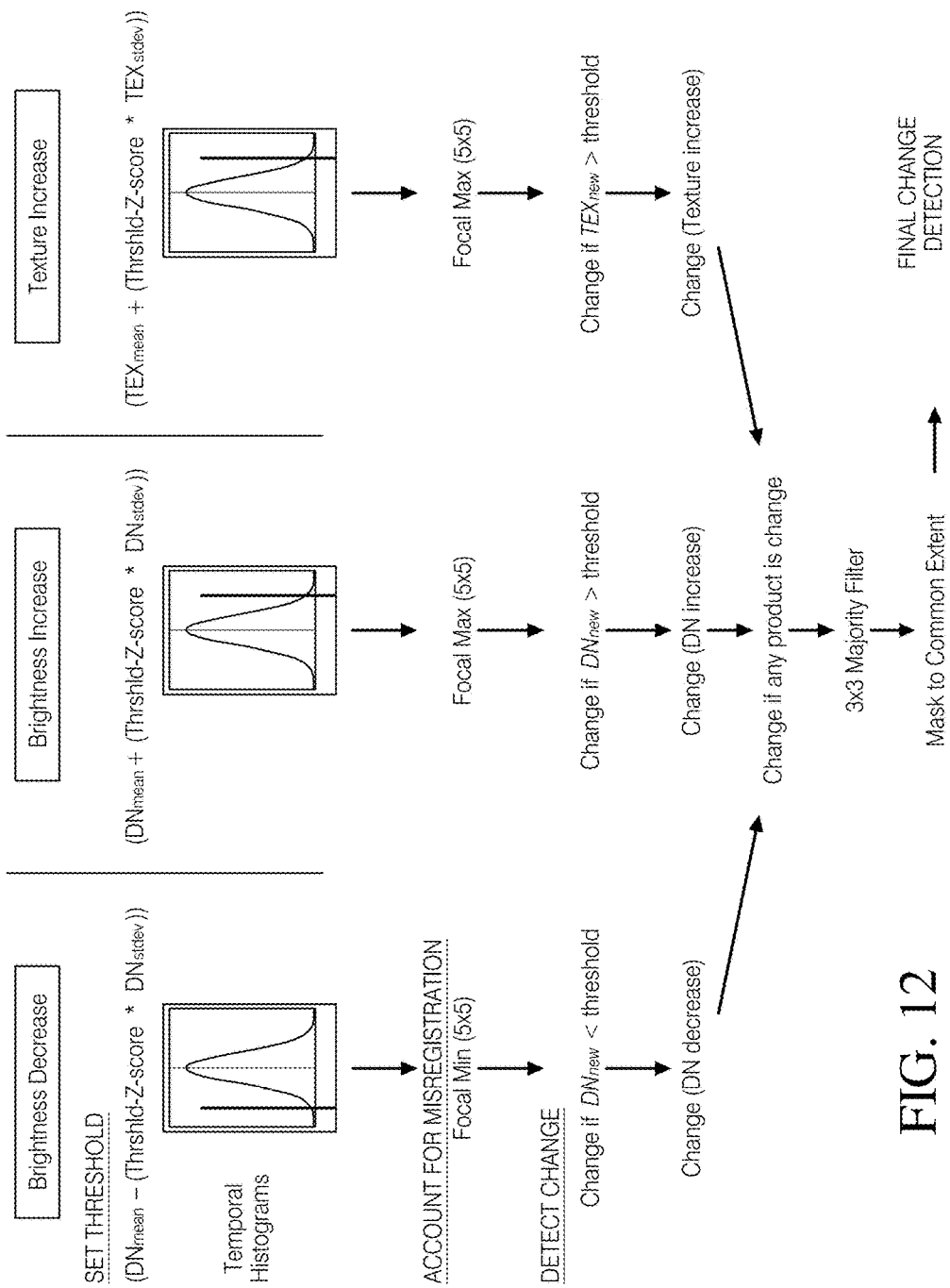
FIG. 12 illustrates a flow diagram showing an example of some operations that that be performed in a method of wide area surveillance. DN in the figure indicates digital number value. The histograms represent normally distributed data, with Z-score value of zero at the center and Z-score values of plus or minus four standard deviations at the edges.

In some embodiments of the method for performing wide area surveillance, the method includes the following as illustrated in FIG. 11 and FIG. 12:

1) Identifying RECENT PAST IMAGES that were acquired at approximately the same time of day (e.g., within 15-30 minutes or so) as the SUBJECT IMAGE, spatially co-registering the RECENT PAST IMAGES using a master image (as listed in FIG. 11) as a reference.

Radiometrically co-registering (or normalizing) the co-registered RECENT PAST IMAGES may also be optionally performed. This can be accomplished using histogram matching approaches where the image values are adjusted so that the mean and standard deviation of all pixels within common areas match.

Optionally stacking multitemporal images to simplify processing.

Extracting the red waveband from the spatially and radiometrically co-registered RECENT PAST IMAGES (referred to as DN (red) in FIG. 11).

2) Computing the mean brightness and standard deviation of brightness between corresponding red waveband pixels within the RECENT PAST IMAGES (in FIG. 11 and FIG. 12, these products are indicated in parentheses as DNmean and DNstdev). Taken together, the red waveband mean and standard deviation values provide an indication of the expected range in image brightness over time on a per-pixel basis. The distribution of red waveband values over time is expected to be normally distributed as represented in FIG. 12 by the normally distributed histogram of values. Mean and standard deviation values are calculated based on temporal information (mean over time, and standard deviation over time), on a pixel-by-pixel basis.

3) Computing LOCAL IMAGE TEXTURE for each pixel within each of the RECENT PAST IMAGES, thereby creating texture images (referred to as Texture in FIG. 11).

4) Computing the temporal mean LOCAL IMAGE TEXTURE and standard deviation of LOCAL IMAGE TEXTURE (per pixel) between corresponding pixels within the RECENT PAST IMAGES. In FIG. 11 and FIG. 12 the mean LOCAL IMAGE TEXTURE and standard deviation of LOCAL IMAGE TEXTURE for each spatial pixel are referenced as TEXmean and TEXstdev, respectively. Taken together, the mean LOCAL IMAGE TEXTURE and standard deviation of LOCAL IMAGE TEXTURE provide an indication of the expected range in LOCAL IMAGE TEXTURE over time on a per-pixel basis. The distribution of LOCAL IMAGE TEXTURE values over time is expected to be normally distributed as represented in FIG. 12 by the normally distributed histogram of values. Mean and standard deviation values are calculated based on temporal information (mean over time, and standard deviation over time), on a pixel-by-pixel basis.

Spatially co-registering the SUBJECT IMAGE (referred to as "New Image" in FIG. 11) with the RECENT PAST IMAGES, using the same master image (as listed in FIG. 11) for the reference as was used with the RECENT PAST IMAGES.

Radiometrically aligning the spatially co-registered SUBJECT IMAGE with the RECENT PAST IMAGES. This is accomplished using histogram matching approaches where the image values are adjusted so that the mean and standard deviation of all pixels within common areas match.

Extracting the red waveband from the new SUBJECT IMAGE (to create DNnew as this product is labeled in FIG. 11 and FIG. 12)

Computing LOCAL IMAGE TEXTURE for the SUBJECT IMAGE (to create TEXnew as this product is referred to as in FIG. 11 and FIG. 12)

5) Identifying SUBJECT IMAGE pixels that are brighter than expected (this workflow is listed as Brightness Increase in FIG. 12). This may be accomplished by identifying and setting a threshold value for standard deviations above mean brightness of the RECENT PAST IMAGES (the threshold is applied uniquely per-pixel using the formula listed in FIG. 12 under "Set Threshold"). Above this value, the SUBJECT IMAGE pixel is found to be outside of the expected range and is detected as a potential change. To account for potential image misregistration on the order of 1-2 pixels, the SUBJECT IMAGE red waveband brightness value can also be greater than the maximum digital number value detection threshold for all 24 neighboring pixels within a 5×5 window centered on the pixel of interest in the SUBJECT IMAGE (this is indicated by the Focal Max (5×5) step followed by the "Change if DNnew >threshold). The change product created using this procedure is indicated in FIG. 12 as "Change (DN increase)."

6) Identifying SUBJECT IMAGE pixels that are darker than expected (this workflow is listed as Brightness Decrease in FIG. 12). This may be accomplished by identifying and setting a threshold value for standard deviations below mean brightness of the RECENT PAST IMAGES (the threshold is applied uniquely per-pixel using the formula listed in FIG. 12 under "Set Threshold"). Below this value, the SUBJECT IMAGE pixel is found to be outside of the expected range and is detected as a potential change. To account for potential image misregistration on the order of 1-2 pixels, the SUBJECT IMAGE red waveband brightness value must also be less than the minimum digital number value detection threshold for all 24 neighboring pixels within a 5×5 window centered on the pixel of interest in the SUBJECT IMAGE (this is indicated by the Focal Max (5×5) step followed by the "Change if DNnew <threshold). The change product created using this procedure is indicated in FIG. 12 as "Change (DN decrease)."

7) Identifying SUBJECT IMAGE pixels whose LOCAL IMAGE TEXTURE value is greater than expected (this workflow is listed as Texture Increase in FIG. 12). This may be accomplished by identifying and setting a threshold value for standard deviations above mean LOCAL IMAGE TEXTURE of the RECENT PAST IMAGES (the threshold is applied uniquely per-pixel using the formula listed in FIG. 12 under "Set Threshold"). Above this value, the SUBJECT IMAGE pixel is found to be outside of the expected range and is detected as a potential change. To account for potential image misregistration on the order of 1-2 pixels, the SUBJECT IMAGE LOCAL IMAGE TEXTURE value must also be greater than the maximum texture value detection threshold for all 24 neighboring pixels within a 5×5 window centered on the pixel of interest in the SUBJECT IMAGE (this is indicated by the Focal Max (5×5) step followed by the "Change if TEXnew >threshold). The change product created using this procedure is indicated in FIG. 12 as "Change (Texture increase)."

9) Merging the "Change (DN Decrease)," "Change (DN Increase)," and "Change (Texture Increase)" products listed in FIG. 12 and described above (where SUBJECT IMAGE values are outside of the expected range of minimum brightness, maximum brightness, or maximum texture) on a per-pixel basis, so that change is detected when any individual pixel in any of these products is classified as change, and no detection occurs when none of the three products indicate a change detection. In FIG. 12 this step is referred to as "Change if any product is change."

10) Filtering the merged change image to remove isolated change pixels and grow clusters of change pixels. After the three image-based detection results have been merged into one product, portions of the image with isolated detections (e.g., 1, 2, 3, etc. pixels by themselves) are removed from the detection, so that only larger features of interest remain. This is accomplished using local majority filter windows (e.g., with 3×3 window), which remove isolated pixels and grows groups of pixels that are predominately detected as change. The majority filter also grows clusters of pixels where the majority is detected as change.

Optionally mask change images to the common extent of the RECENT PAST IMAGES, if this required or desired. This is the final step to create the "FINAL CHANGE DETECTION" result.

The approach listed above identifies image pixels whose characteristics are outside of the expected range and indicate a change. At least five adjustable controls may be utilized, including: 1) three thresholds of standard deviation values around the mean above/below which SUBJECT IMAGE brightness (increase or decrease) or texture increase values must fall in order to indicate a detection of a moving object, 2) the distance at which misregistration is accounted for by raising or lowering (on a local basis) temporal mean and standard deviation values so that misregistration is not causing false detection, and 3) the size of the focal majority that is utilized to identify and remove isolated false detections. To reiterate, for each pixel a unique change threshold is established by setting a Z-score threshold (calculated as the mean plus or minus a specified standard deviation value) that exploits the expected normal distribution of image brightness or texture values over time per-pixel given information from all of the RECENT PAST IMAGES. The Z-score threshold (along with the other controls described immediately above) may be interactively increased or decreased to change the sensitivity required for detection.

Applications of Automated Moving Object Detection Using Time Series Images

The approach has a wide variety of applications using nearly any camera system, from any platform, at any location, with any viewing perspective, at any scale. Applications include military battlefield monitoring (equipment, enemy personnel, improvised explosive devise installation), border monitor (illicit activity such as smuggling and illegal immigration), wildlife tracking, astronomy (Earth crossing asteroids, etc.), microbiology (e.g., counting multiplying cells), and medical imaging (e.g. X-ray, MRI, etc.). Given the increasing usage and great potential of unmanned aerial vehicles for intelligence, surveillance, and reconnaissance (ISR), the approach will readily be implementable for airborne reconnaissance and wide area surveillance.

The above description of disclosed embodiments is provided to enable any person skilled in the art to make or use described embodiments. Various modifications to the embodiments will be readily apparent to those skilled in the art, the generic principals defined herein can be applied to other embodiments without departing from spirit or scope of the application. Thus, the application is not intended to be limited to the embodiments shown herein but is to be accorded the widest scope consistent with the principals and novel features disclosed herein.

Computer System

Figure 9:
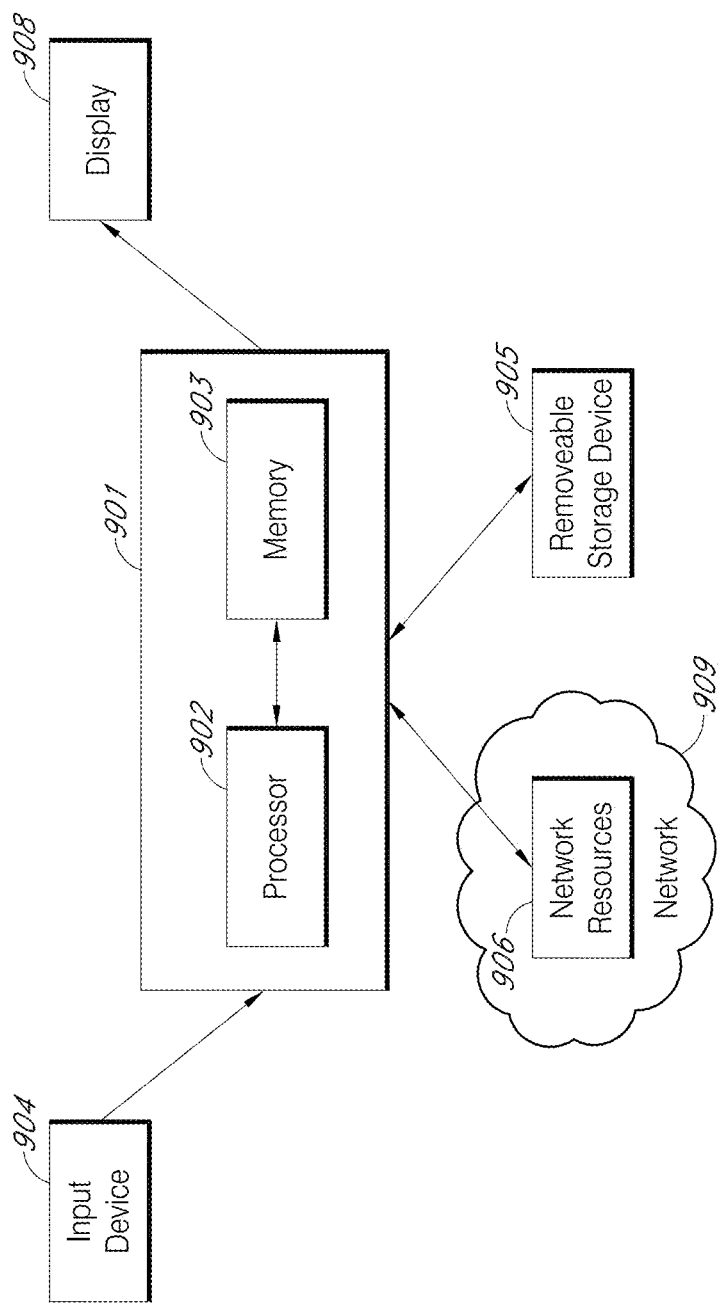
FIG. 9 is a block diagram that illustrates an example of a computer/server system upon which some embodiments of the methods disclosed herein may be implemented.

FIG. 9 is a block diagram that illustrates an embodiment of a computer/server system 900 upon which an embodiment of the methodology may be implemented. The system 900 includes a computer/server platform 901 including a processor 902 and memory 903 which operate to execute instructions, as known to one of skill in the art. Such instructions may include any software modules described herein. The term "computer-readable storage medium" as used herein refers to any tangible medium, such as a disk or semiconductor memory, that participates in providing instructions to processor 902 for execution. Additionally, the computer platform 901 receives input from a plurality of input devices 904, such as a keyboard, mouse, touch device or verbal command. The computer platform 901 may additionally be connected to a removable storage device 905, such as a portable hard drive, optical media (CD or DVD), disk media or any other tangible medium from which a computer can read executable code. The computer platform may further be connected to network resources 906 which connect to the Internet or other components of a local public or private network. The network resources 906 may provide instructions and data to the computer platform from a remote location on a network 907. The connections to the network resources 906 may be via wireless protocols, such as the 802.11 standards, Bluetooth® or cellular protocols, or via physical transmission media, such as cables or fiber optics. The network resources may include storage devices for storing data and executable instructions at a location separate from the computer platform 901. The computer interacts with a display 908 to output data and other information to a user, as well as to request additional instructions and input from the user. The display 908 may therefore further act as an input device 904 for interacting with a user.

What is claimed is:

1. A method of precise image-based real-time change detection with imagery collected from airborne platforms, comprising:
  (a) flight planning a location loc=1 for airborne image capture comprising georeferencing coordinates and altitude information;
  (b) capturing multiple reference aerial digital images, of which the first is a reference first aerial digital image captured at a first time point t=1, at the location loc=1 using a digital frame sensor mounted on an aerial platform, and saving the reference first aerial digital image;
  (c) collecting georeference coordinates and altitude information of the aerial platform at the location loc=1 at the first time point t=1, and saving the location loc=1 at time t=1 to memory;
  (d) after all of the multiple reference aerial digital images have been captured, operating the aerial platform at a later point in time t=2 using a flight plan software that includes the georeference coordinates and altitude information at the location loc=1;
  (e) capturing a second aerial digital image at the location loc=1 at the later point in time t=2, using the digital frame sensor mounted on the aerial platform, and saving the second aerial digital image, wherein the capturing of the second aerial digital image is triggered by the location loc=1;
  (f) performing a registration of the reference first aerial digital image and the second aerial digital image, wherein the step of registration comprises matching feature points on the second aerial digital image to the reference first aerial digital image, and applying a geometric transformation to the second aerial digital image to align the second aerial digital image with the reference first aerial digital image;

(g) outputting an aligned image as a result of the geometric transformation;

(h) applying a pixel-by-pixel change detection algorithm to compare the aligned image to the reference first aerial digital image by calculating a mean and a standard deviation for pixel brightness and a mean and a standard deviation for texture of adjacent pixels for the multiple reference aerial digital images, establishing threshold conditions based on the calculated mean and standard deviation for pixel brightness and the calculated mean and standard deviation for texture of adjacent pixels, calculating a pixel brightness and a texture of adjacent pixels for the aligned image, and identifying a change when at least one of the calculated aligned image pixel brightness and the calculated aligned image texture of adjacent pixels satisfies at least one of the established threshold conditions; and, (i) outputting a change-identified aligned image;

wherein steps (a)-(i) are performed using a processor.

2. The method of claim 1, further comprising a step of georeferencing the reference first aerial digital image and the aligned image.

3. The method of claim 1, wherein the step of performing a geometric transformation comprises a step of performing a warping transformation.

4. The method of claim 3, wherein the step of performing a warping transformation comprises a projective transformation, a second-order polynomial transformation, or a piece-wise linear rubbersheeting transformation.

5. The method of claim 1, wherein the step of outputting a change-identified aligned image further comprises outputting a plurality of change-identified aligned images.

6. The method of claim 5, further comprising a step of assembling the plurality of change-identified aligned images into a map layer.

7. A system for performing image-based real-time change detection comprising:

an aerial platform a digital frame sensor on the aerial platform and configured to capture a second aerial digital image of a region;

a navigation system on the aerial platform, in communication with the digital frame sensor and configured to provide an approximate location of the digital frame sensor; and memory comprising multiple reference first aerial digital images saved therein;

wherein the multiple reference first aerial digital images were captured during an earlier flight of the aerial platform prior to capture of the second aerial digital image;

wherein each frame of the multiple reference first aerial digital images is associated with a previously captured georeference location;

wherein the navigation system is configured to send a signal to the digital frame sensor to capture the second aerial digital image of the region when the digital frame sensor reaches the previously captured georeference location; and wherein the system has at least one processor configured to perform the following:

(a) receive the second aerial digital image of the region from the digital frame sensor;

(b) pair the second aerial digital image with the multiple reference first aerial digital images that correspond with the previously captured georeference location; and (c) output an aligned image, wherein the aligned image is generated by registering the second aerial digital image with at least one of the multiple reference first aerial digital images by matching control points, and by applying a geometric transformation to the second aerial digital image;

(d) apply a pixel-by-pixel change detection algorithm to compare the aligned image to the multiple reference first aerial digital images by calculating a mean and a standard deviation for pixel brightness and a mean and a standard deviation for texture of adjacent pixels for the multiple reference first aerial digital images, establishing threshold conditions based on the calculated mean and standard deviation for pixel brightness and the calculated mean and standard deviation for texture of adjacent pixels, calculating a pixel brightness and a texture of adjacent pixels for the aligned image, and identifying a change when at least one of the calculated aligned image pixel brightness and the calculated aligned image texture of adjacent pixels satisfies at least one of the established threshold conditions; and, (e) output a change-identified aligned image.

8. The system of claim 7, wherein the multiple reference first aerial digital images are georeferenced using Global Navigation Satellite System (GNSS)-derived sensor station positions and sensor attitude information from inertial measurement unit (IMU) data.

* * * * *